United States Patent
Reilly et al.

(10) Patent No.: US 6,596,222 B2
(45) Date of Patent: Jul. 22, 2003

(54) CARRIAGE ASSEMBLY FOR POSITIONING AND MOVING EQUIPMENT RELATIVE TO A WALL

(75) Inventors: Thomas L. Reilly, Nutley, NJ (US); A. Ronald Jacobstein, Stuart, FL (US)

(73) Assignee: ThermTech Services, Inc., Stuart, FL (US)

( * ) Notice: Subject to any disclaimer, the term of this patent is extended or adjusted under 35 U.S.C. 154(b) by 0 days.

(21) Appl. No.: 09/931,851

(22) Filed: Aug. 20, 2001

(65) Prior Publication Data

US 2003/0034592 A1 Feb. 20, 2003

(51) Int. Cl.[7] ................................................ B23K 7/10
(52) U.S. Cl. ................................... 266/67; 266/77
(58) Field of Search ............................. 266/48, 67, 73, 266/77

(56) References Cited

U.S. PATENT DOCUMENTS

| | | | |
|---|---|---|---|
| 2,055,527 A | * | 9/1936 | Glaum, Jr. et al. ........... 266/67 |
| 3,681,565 A | | 8/1972 | Fisher |
| 3,810,515 A | | 5/1974 | Ingro |
| 4,071,227 A | * | 1/1978 | McDonald .................... 266/67 |
| 4,574,387 A | | 3/1986 | Gignoux et al. |
| 5,332,143 A | | 7/1994 | Furukawa et al. |
| 5,535,628 A | | 7/1996 | Rutherford |
| 5,693,286 A | * | 12/1997 | Hatakana et al. ............. 266/67 |
| 5,853,655 A | | 12/1998 | Baker |
| 6,000,844 A | | 12/1999 | Cramer et al. |

\* cited by examiner

*Primary Examiner*—Scott Kastler
(74) *Attorney, Agent, or Firm*—Burns, Doane, Swecker & Mathis, LLP

(57) ABSTRACT

A carriage assembly is shown for moving equipment for testing or other functions along a wall surface. The carriage assembly includes a main frame for supporting the equipment in relationship to other equipment and to the wall surface, and a sub-frame that supports service lines such as wires and hoses, while isolating loads created by moving the service lines with the carriage from the main frame and the mounted equipment and providing an unobstructed field of view of the subject area under examination. Wheels mounted on the carriage assembly for providing the interface with the wall surface include fixed position wheels and adjustable wheels to compensate for irregularities along the wall surface. At least one of the fixed position wheels or the adjustable wheels are magnetic for holding the carriage against a ferrous or magnetic wall surface.

20 Claims, 6 Drawing Sheets

TROLLEY ASSY

WHEEL ASSYS

WHEEL ASSY
SELF-ADJUSTING

CARRIAGE ASSEMBLY FOR POSITIONING AND MOVING EQUIPMENT RELATIVE TO A WALL

FIELD OF THE INVENTION

The present invention relates generally to a carriage assembly that allows for accurate positioning and movement of testing, inspection and examination devices or other equipment relative to a stationary wall or surface.

BACKGROUND OF THE INVENTION

Carriages for automated welding or cutting are known in the art, and provide means for transporting welding heads and/or cutting torches along with related power and fluid supply systems, including gas hoses, power cables and wire feed, following a track, band or mechanical device along a surface requiring welding. A carriage which is guided and propelled by a remote-controlled motor driven magnetic wheel system is disclosed in U.S. Pat. No. 5,853,655.

Known carriage assemblies for use in automated welding or cutting are not well suited for traveling along a non-planar wall, such as the corrugated inner walls consisting of parallel pipes or tubes that form the boilers in power generating plants. The cables and hoses that provide power and working fluids to the tools carried by prior art carriages are directly connected to the same structural members that carry the tools themselves, and therefore can exert loads on the carriage that affect the accuracy of positioning the tools during a welding operation. Known carriages rely upon a guidance jig or reference line scribed on the surface to be welded in order to automatically position the torch or other tool being carried by the carriage. Irregularities in the surface along which the carriage is moving will affect the accuracy of positioning the carriage along a guidance jig or reference line since the wheels on the prior art carriages are not provided with a means for automatically adjusting to the irregularities in the surface.

SUMMARY OF THE INVENTION

In view of the above disadvantages of known carriages for moving welding or cutting equipment along a wall surface, the present invention is directed to an improved carriage assembly for moving equipment for testing or other functions along a wall surface. A carriage assembly according to an embodiment of the invention includes a first main frame that supports the equipment and is in turn supported by a hoisting cable, and a second sub-frame connected to the main frame preferably at a single point, with the second sub-frame supporting at least one of cables, wires, and hoses that supply or receive at least one of data, power, and working fluids to the equipment. The second sub-frame substantially isolates any loads and moments created by the cables, wires and/or hoses from the first main frame, with the total weight of the second sub-frame and the cables, wires and/or hoses it is attached to being carried by the hoisting cable. At least one set of positioning wheels are connected to the main frame at a fixed distance from the frame, and at least one set of magnetic holding wheels are connected to the main frame at an adjustable distance from the frame. The magnetic wheels can be spring biased toward the frame in order to compensate for irregularities in the surface along which the carriage assembly is moving, while the fixed positioning wheels can be forced to maintain contact with the wall surface and thereby provide an accurate spacing between the equipment mounted on the main frame and the wall surface. At least four fixed positioning wheels can be provided to assure that the carriage and its spacing from the wall will remain stable and constant even when variations in the wall surface cause a wheel to disengage from the wall. Although the preferred embodiment provides adjustable magnetic holding wheels and fixed, non-magnetic positioning wheels, one of ordinary skill in the art will recognize that the magnetic holding wheels could be positioned at a fixed distance from the frame, and non-magnetic wheels such as rubber rollers could be provided with adjustability in their position relative to the frame, including spring biasing toward or away from the frame.

A carriage assembly according to an embodiment of the invention is particularly useful in applications involving non-destructive testing, examination and inspection of boiler walls or other structures, such as identifying material thickness and defects using a spatially-controlled heat application as disclosed in U.S. Pat. No. 6,000,844 to Cramer et al., which is herein incorporated in its entirety by reference. The present invention is well suited for tracking along a boiler wall having parallel boiler tubes with irregularities in their spacing, while maintaining an accurate spacing between equipment including a heater and temperature measuring devices mounted on the carriage, and the wall surface. As disclosed in U.S. Pat. No. 6,000,844, a heater moving along the surface of the wall raises the temperature of the material forming the wall as a function of the thickness of the material at the point where the heat is being applied. A temperature sensor such as an infrared camera and associated optics detects the change in temperature of the wall surface as the heater is moved along the wall, and thereby provides a measurement of the wall thickness at points along the path traveled by the heater. Such an inspection system provides an effective and accurate means for detecting flaws in the pipes or tubes making up the walls of a boiler, such as build-ups of deposits, etc., which could lead to dangerous and catastrophic failures. This also can apply to measurements of structural members of other structures where similar concerns exist such as tanks and containers, vessel hulls, and other structures for material containment. In the case of detection of irregularities in wall thickness by this method, accurate positioning of the testing equipment relative to the wall surface is vital to meaningful results. The limited access openings into boilers and other vessels that may benefit from such inspections also necessitates a compact carriage assembly for carrying the testing equipment along the walls, with the carriage assembly lending itself to relatively easy disassembly and assembly.

BRIEF DESCRIPTION OF THE DRAWINGS

The foregoing and other features and advantages of the present invention will become more readily appreciated as the same become better understood by reference to the following detailed description of the preferred embodiments of the invention, when taken in conjunction with the accompanying drawings, wherein.

DETAILED DESCRIPTION OF THE PREFERRED EMBODIMENT

A carriage assembly according to an embodiment of the invention can be used for moving inspection and examination equipment for testing or other functions along a wall, and can be easily assembled and disassembled so that the structural components of the carriage assembly will fit through limited access openings into the interior of boilers or other vessels to be tested or repaired. The carriage assembly includes a main frame on which the inspection and examination equipment can be mounted, and a sub-frame that is connected to the main frame and that carries various supply lines such that the sub-frame substantially isolates any loads and moments created by the supply lines from the main frame structure. The dual frame structure ensures the accuracy of positioning of the equipment mounted on the main frame relative to a wall along which the carriage assembly is moved. Adjustable magnetic holding wheels are also provided separately from fixed positioning wheels that are preferably rollers made from rubber or other materials to provide a smooth, cushioned contact between the carriage and the wall. As mentioned above, alternative embodiments could provide the nonmagnetic, cushioned contact wheels with adjustability in their position relative to the main frame, while the magnetic holding wheels are fixed in position relative to the main frame. The combination of fixed position wheels and adjustable position wheels assures the accuracy of positioning of the carriage relative to a wall surface that has irregularities along its surface, such as the corrugated surface on the inside of a boiler vessel.

In a preferred embodiment, the adjustability of the magnetic holding wheels allows for variations in the force with which the magnetic holding wheels hold the carriage against the wall as well as compensating for irregularities along the surface of the wall. The combination of adjustable holding wheels and fixed positioning wheels ensures that the equipment mounted on the carriage is always positioned accurately relative to the surface of the wall.

Figure 1:
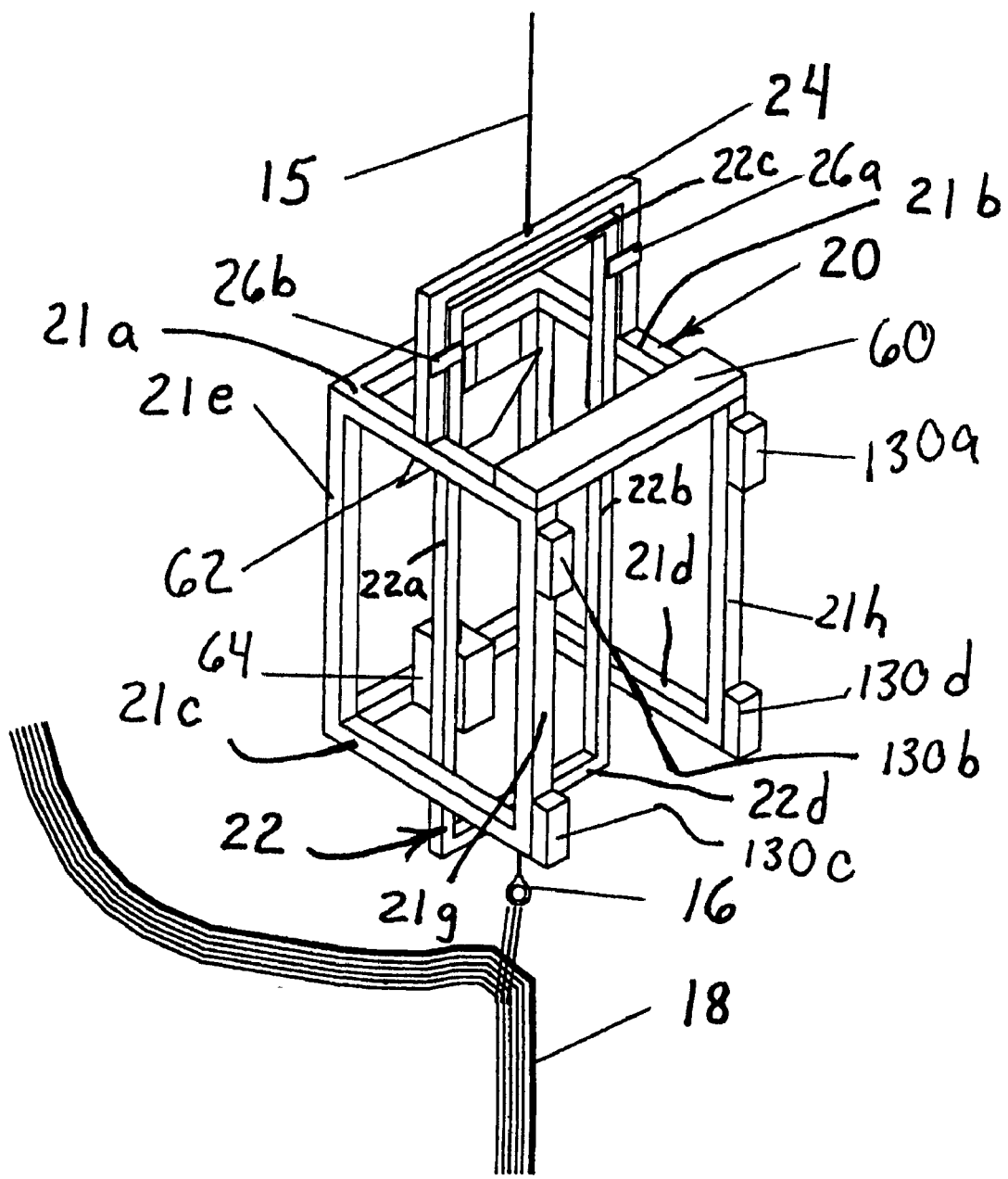
FIG. 1 is a perspective view of an embodiment of a carriage assembly according to the invention.
Figure 6:
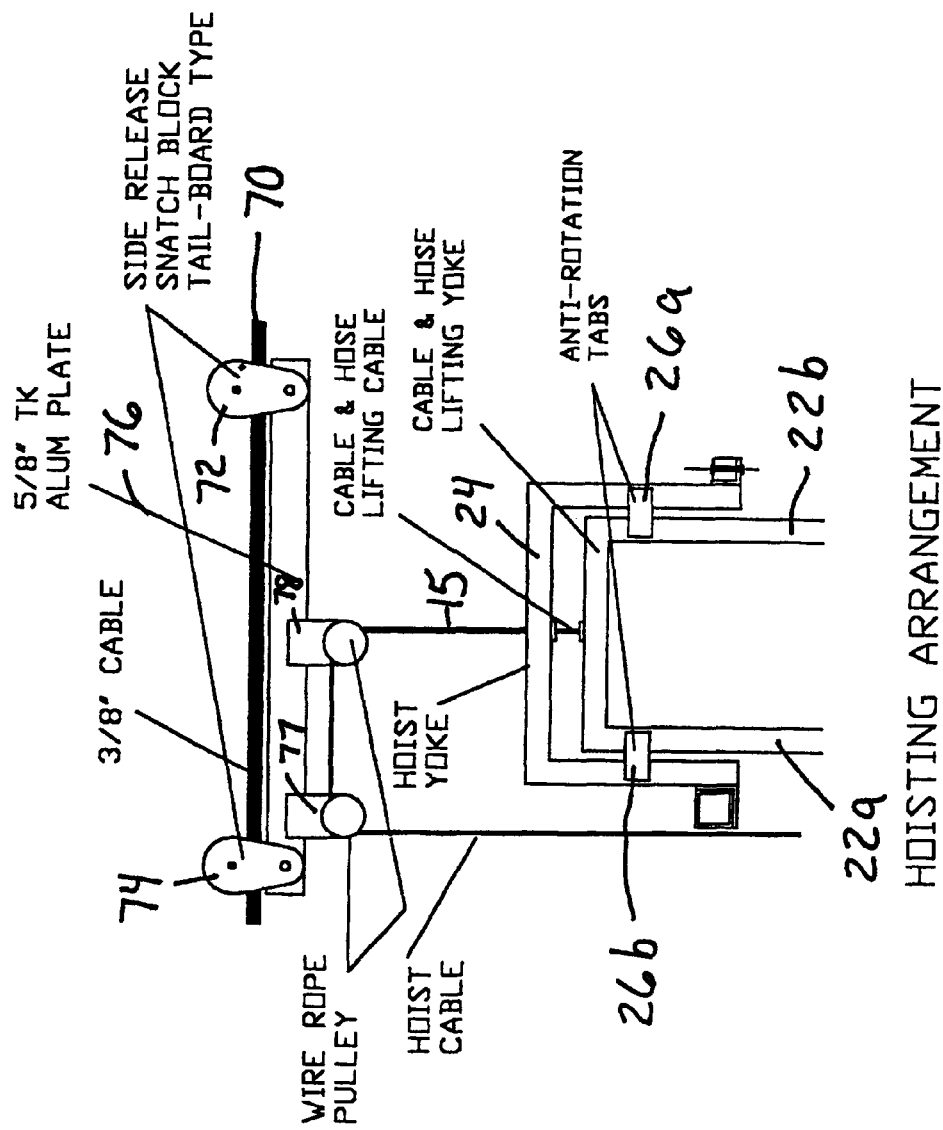
FIG. 6 is a schematic illustration of a hoisting system for lifting a carriage according to an embodiment of the invention.

In the embodiment shown in FIG. 1, the carriage assembly includes a main frame 20, and a sub-frame 22. A hoisting cable 15 is connected to a lifting yoke 24 connected to the main frame 20, and as shown in FIG. 6, the hoisting cable 15 is also connected to the sub-frame 22. In the embodiment shown in FIG. 1, the main frame 20 includes at least structural components 21a–21h, which are connected to form a substantially box-like structure, and which can be detachably connected using known methods such as by bolting. Where access to the wall surface to be tested is not limited, as in boilers, etc., and space is not a problem, the carriage can also be more permanently joined together, such as by welding or riveting.

Figure 2:
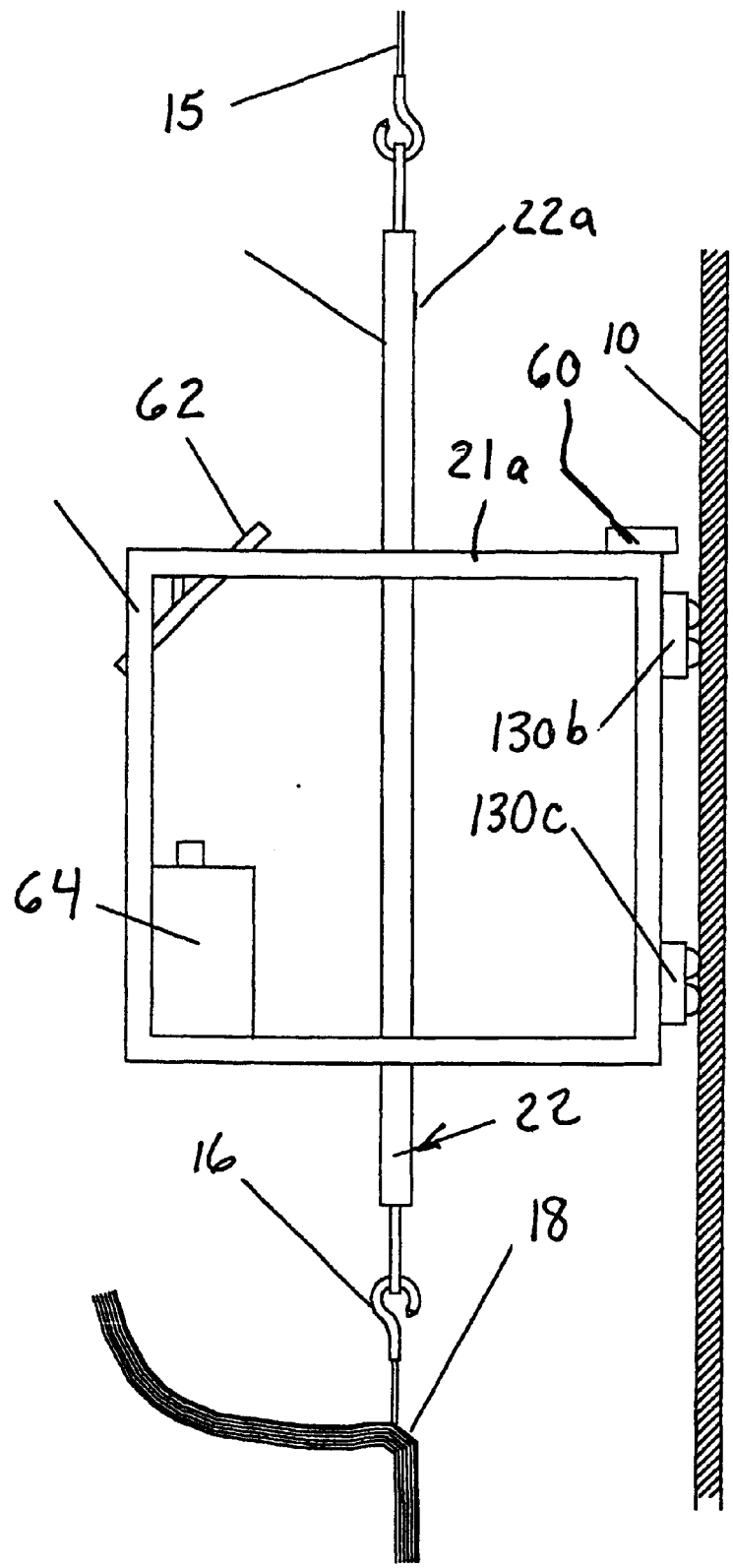
FIG. 2 is a side elevation view of the carriage assembly shown in FIG. 1.

As shown in FIGS. 1 and 2, the frame 20 provides support for various components used in testing or other functions, such as a line heater 60, a mirror 62, and an infrared camera 64. Various arrangements and combinations of equipment used for testing or other functions can obviously be provided, with the main frame 20 providing the support and positioning means for the various components, and maintaining the various components in the proper spatial relationship relative to each other and relative to the surface along which the carriage is to be moved.

As shown in FIGS. 1 and 2, a bundle of service cables and hoses 18 for providing power, data, working fluids, etc., to the equipment mounted on the main frame 20 are connected by a connector 16 to the sub-frame 22. The loads and moments associated with carrying the service lines 18 as the carriage assembly is moved along a wall or other surface, are passed directly through the sub-frame 22 to the hoisting cable 15, and are substantially isolated from the main frame 20. Anti-torsion or anti-rotation members 26a, 26b can be provided between the sub-frame 22 and the lifting yoke 24 to stabilize the sub-frame 22 without transmitting any significant torsional forces to the main frame 20. The sub-frame 22 is designed so as not to obstruct the field of view from a camera and mirror combination to the surface being inspected or examined. Alternative embodiments can include other configurations of the sub-frame and the main frame, with the sub-frame carrying the load of the service lines without exerting any bending moments on the main frame that may affect the positions of the equipment mounted on the main frame relative to each other or relative to the surface along which the carriage is moving.

Wheel assemblies 130a–130d are shown schematically as representational blocks in FIG. 1, and provide the means for positioning the carriage assembly on a wall. Although the details are not shown in FIG. 1, the wheel assemblies can include various combinations of adjustable and fixed wheels, and magnetic and non-magnetic wheels.

As shown in FIG. 2, wheel assemblies 130a–130d are mounted on main frame members 21g, 21h, and therefore result in the accurate positioning of components mounted on the main frame relative to the wall 10. The weight of the service cables and hoses 18 is carried by the sub-frame 22, which is directly connected to the hoisting cable 15, or the main frame 20 at the point of connection of the hoisting cable 15, as seen in FIG. 6.

Figure 3:
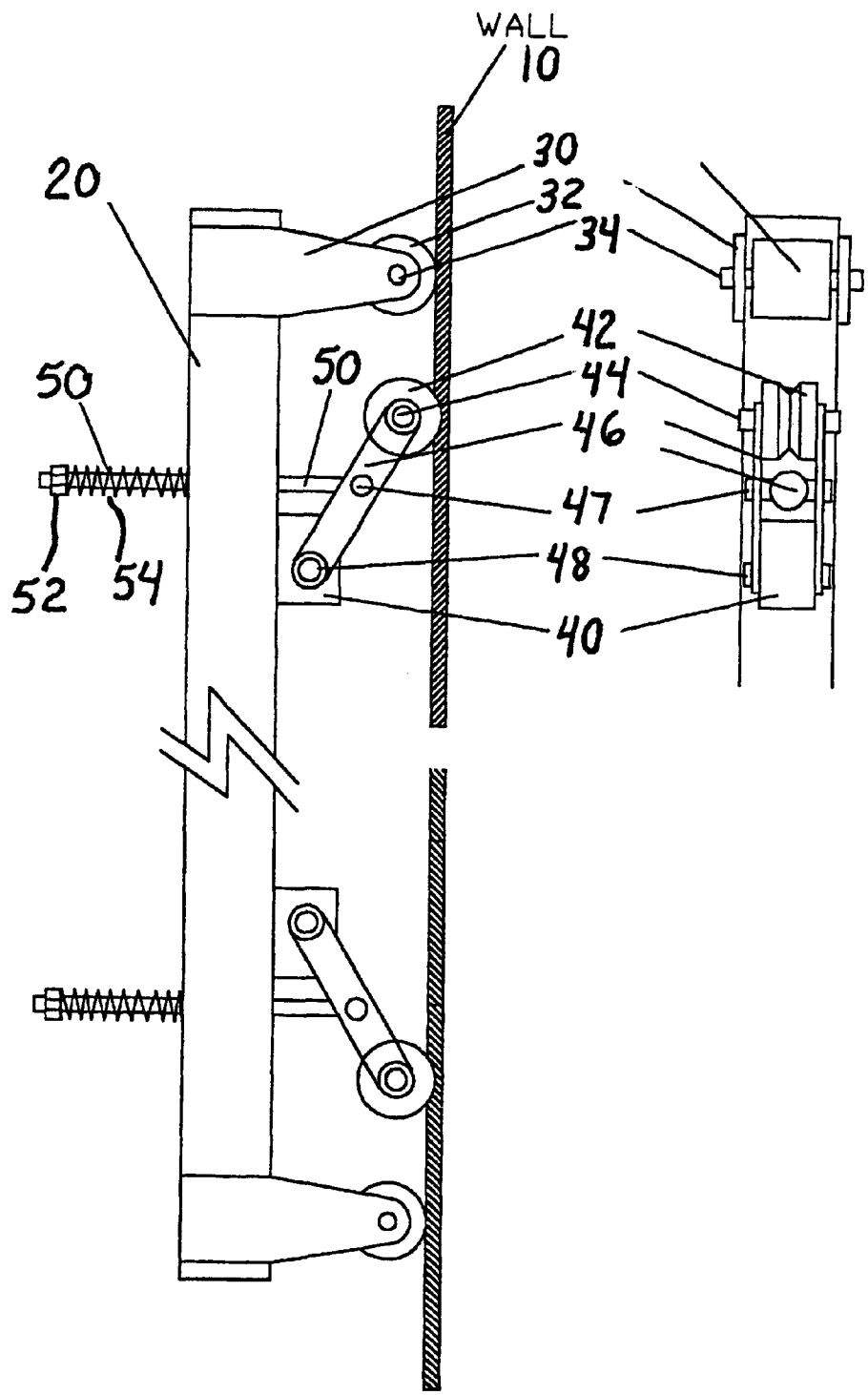
FIG. 3 is a side elevation view of a carriage assembly according to an embodiment of the invention, showing in detail the fixed positioning wheels and adjustable magnetic holding wheels.
Figure 4:
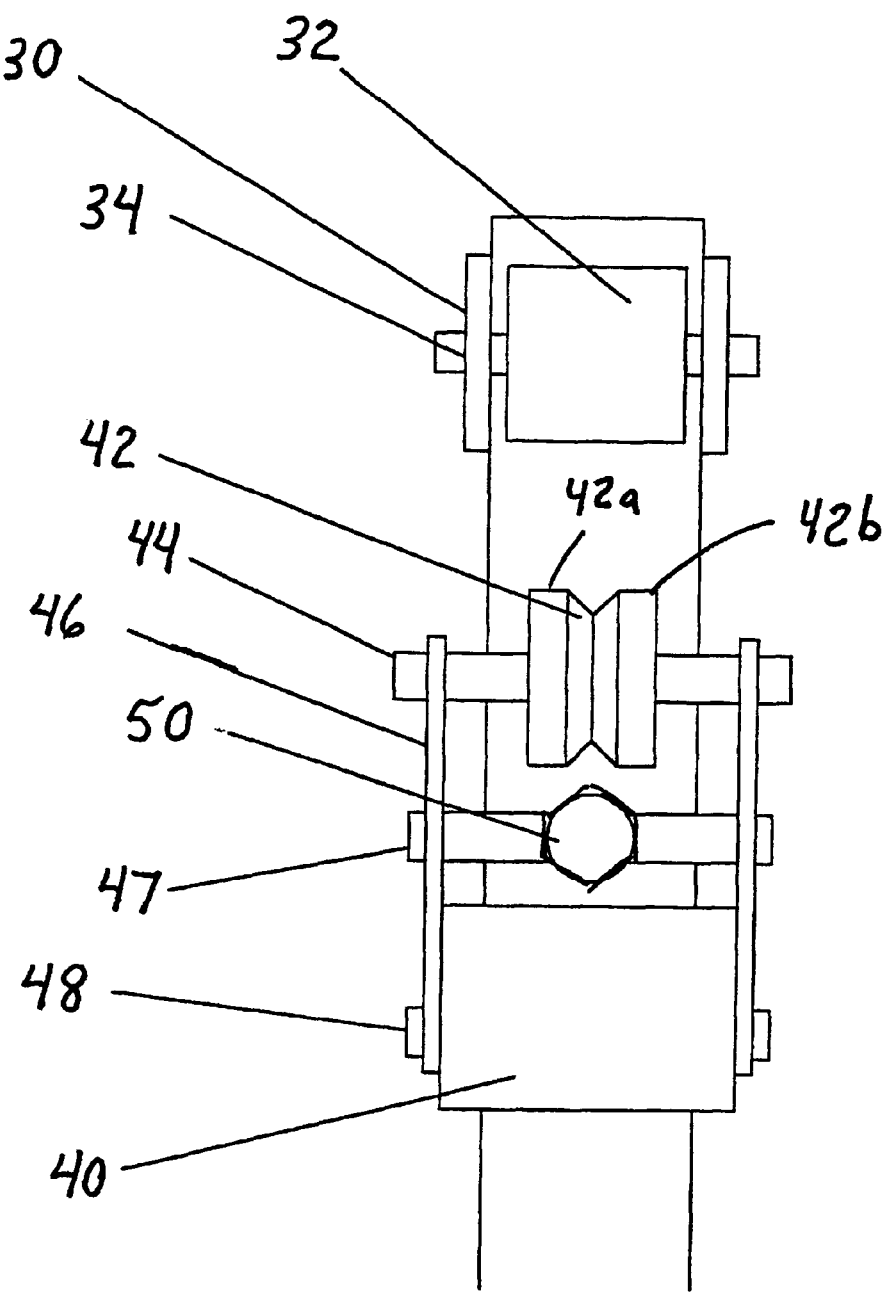
FIG. 4 is an elevation view of a self-aligning magnetic holding wheel assembly according to an embodiment of the invention.
Figure 5:
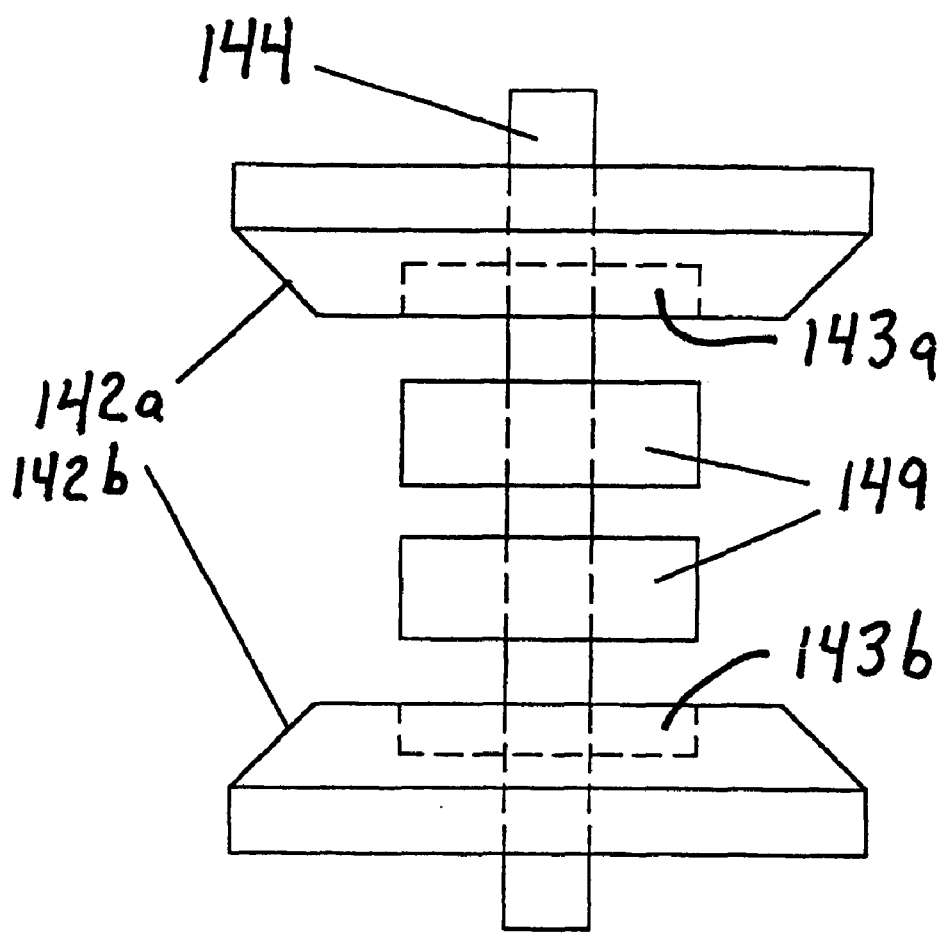
FIG. 5 is an exploded view of a magnetic holding wheel according to an embodiment of the invention.
Figure 5:
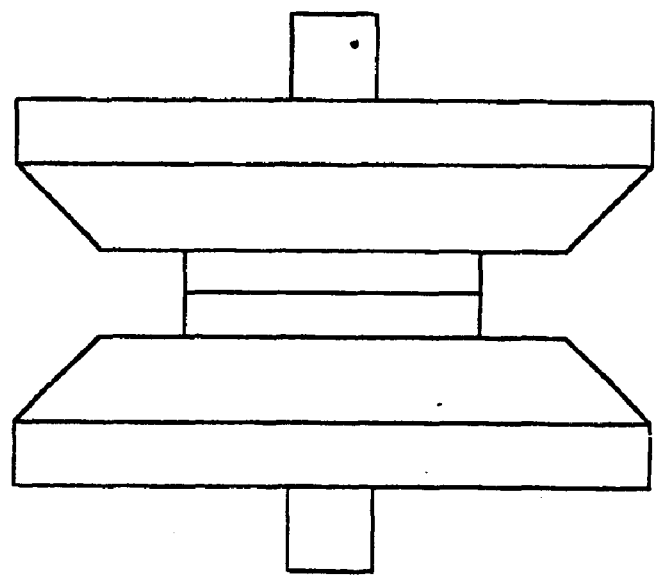

Details of the wheel assemblies of a preferred embodiment used for positioning the carriage relative to the wall 10 are shown in FIGS. 3–5. As shown in FIG. 3, each wheel assembly can include a fixed wheel 32, preferably in the form of a rubber roller or other cushioning roller, and an adjustable magnetic wheel 42. The fixed wheel 32 is preferably made from a material with some resiliency, such as a rubber roller, in order to provide a smooth interface between the surface 10 and the carriage. The fixed wheel 32 can be rotatably mounted to the carriage by a roller shaft 34 and a pair of mounting brackets 30.

The magnetic wheel 42 can be rotatably mounted on a shaft 44, which is mounted near the distal end of a pair of pivotal brackets 46. The brackets 46 are pivotally mounted at their proximal end to a block 40 or other interface between the brackets and the carriage main frame 20. The block 40 provides a pivoting point for the brackets as well as lateral support and stabilization for the brackets 46. An adjusting bolt 50 can be connected at one end to an intermediate point of the brackets 46 by a connecting shaft 47, and at the other end by an adjustable connection to the main frame 20. As shown in FIG. 3, the adjusting bolt 50 can be provided with an adjusting nut 52 and a compression spring 54, such that the tension with which the adjusting bolt pulls on the magnetic wheel brackets 46 can be changed. As the nut 52 is tightened down on the adjusting bolt 50, the spring 54 causes the adjusting bolt 50 to pull the brackets 46 and magnetic wheel 42 toward the main frame 20. When the carriage is positioned on a ferrous or other magnetic surface 10, the magnetic wheel 42 pulls the carriage against the surface with a tension that can be varied by adjusting the nut 52 along adjusting bolt 50. The combination of the adjustable magnetic wheels 42 and the fixed position wheels 32 compensates for irregularities along the surface 10 while maintaining the carriage firmly against the wall and substantially perpendicular to the wall at a fixed distance determined by the spacing of fixed wheel 32 from the main frame 20.

Further adjustability of the magnetic wheels 42 is included in an embodiment illustrated in FIG. 4. The magnetic wheels 42 can be composed of two halves 42*a* and 42*b* that are provided with facing tapered surfaces to conform to the outer periphery of a non-planar surface such as a tube or pipe. The magnetic wheels 42 can also be mounted on shaft 44 so as to be both rotatable and translatable along the shaft 44. As a result of this construction, the lateral distance between the wheels on the main frame can automatically change to compensate for irregularities along the surface 10, such as when the pipes or tubes forming the inner wall of a boiler are not exactly parallel. Although the magnetic wheels are illustrated as having facing conical surfaces in FIGS. 4 and 5, other configurations can also be used to provide the desired interface between the wheels and the surface along which they travel.

As illustrated in FIG. 5, the magnetic wheels can also be composed of separate components such as standard circular permanent magnets 149 and magnetizable contoured pole pieces 142*a* and 142*b*. The advantage of this construction is that the entire wheel including contoured surfaces does not have to be manufactured from difficult to machine magnetic materials. Standard circular permanent magnets 149 are inexpensive and can be inserted into recesses 143*a*, 143*b* of the pole pieces 142*a*, 142*b*. The pole pieces 142*a*, 142*b* can be manufactured from easily machined, magnetizable materials such as steel.

FIG. 6 illustrates one possible hoisting arrangement for moving the carriage assembly within a boiler or along other surfaces. The hoist cable 15 is connected to lifting yoke 24, which is in turn connected to the main frame 20. A short section of the hoist cable 15 or mechanical swivel arrangement can also be provided from lifting yoke 24 to sub-frame 22. The hoist cable 15 can also be passed over at least pulley blocks 77, 78 to reverse the direction of movement of the hoist cable 15 and provide clearance between the hoist cable 15 and the components of the main frame 20, with pulley blocks 77, 78 being suspended from a beam 76. The beam 76 can be supported by side release snatch blocks 72, 74 for movement along a cable 70. The hoisting arrangement illustrated in FIG. 6 is particularly useful for supporting and moving the carriage assembly within a boiler or other vessel since the cable 70 can easily be tensioned across the vessel at whatever height is necessary, and can be readily installed and removed without requiring substantial structural modifications to the vessel. An alternative to this can be a beam suspended between two or more points adjacent to the wall forming a monorail arrangement with the snatch blocks replaced by beam trolleys mounted on the lower flange of the monorail beam.

While preferred embodiments of the present invention have been shown and described, it will be apparent to those skilled in the art that many changes and modifications may be made without departing from the invention in its broadest aspects. The appended claims are therefore intended to cover all such changes and modifications as fall within the scope of the invention. As an example, while the carriage assembly has been illustrated to have a substantially rectangular, box-like configuration, alternative embodiments can include other configurations having a main frame for supporting various equipment components in relation to each other and to a surface along which they are transported, and a sub-frame that supports service lines while isolating loads associated with moving the service lines with the carriage from the main frame supporting the equipment components. The wheel assemblies can be mounted in various positions on the main frame, with the adjustable wheels being either the cushioning, non-magnetic wheels, or the magnetic holding wheels, and with some or all of the wheels being provided with lateral adjustability to compensate for irregularities in the distances between the portions of the surface along which the wheels are tracking.

What is claimed is:

1. A carriage assembly for moving equipment for testing or other functions along a surface, said carriage assembly comprising:
    a frame that supports the equipment;
    at least one set of positioning wheels connected to said frame at a fixed distance from said frame, and
    at least one set of magnetic holding wheels connected to said frame at an adjustable distance from said frame.

2. The carriage assembly according to claim 1, wherein said at least one set of magnetic wheels are spring biased toward said frame.

3. The carriage assembly according to claim 2, wherein said at least one set of magnetic wheels are provided with contact surfaces that substantially conform to a non-planar surface.

4. The carriage assembly according to claim 3, wherein a distance between at least two of said magnetic wheels automatically adjusts as a function of irregularities on the surface to which the contact surfaces of said at least one set of magnetic wheels substantially conform.

5. A carriage assembly for moving equipment for testing or other functions along a wall, said carriage comprising:
    a first main frame that supports the equipment,
    a second sub-frame connected to said first main frame, said second sub-frame supporting at least one of service lines, cables, wires and hoses that supply or receive at least one of data, power, and working fluids to the equipment,
    said second sub-frame substantially isolating any loads created by said at least one of service lines, cables, wires and hoses from said first main frame while providing an unobstructed field of view to an area on the wall being tested or otherwise examined by the equipment.

6. The carriage assembly according to claim 5, wherein said equipment includes optical components mounted on said first main frame, and a heating device mounted on said first main frame.

7. The carriage assembly according to claim 5, wherein at least one set of positioning wheels are connected to said first main frame at a fixed distance from said main frame to maintain said equipment at a fixed distance from the wall, and
    at least one set of adjustable wheels are connected to said main frame at an adjustable distance from said main frame for holding said carriage assembly to the wall.

8. The carriage assembly according to claim 7, wherein said adjustable wheels are magnetic.

9. The carriage assembly according to claim 8, wherein said equipment includes optical components mounted on said first main frame, and a heating device mounted on said first main frame.

10. The carriage assembly according to claim 9, wherein said at least one set of magnetic wheels are spring biased toward said first main frame.

11. The carriage assembly according to claim 10, wherein the amount of spring bias is adjustable.

12. The carriage assembly according to claim 11, wherein said at least one set of magnetic wheels are provided with contact surfaces that substantially conform to a non-planar surface on a wall.

13. The carriage assembly according to claim 12, wherein a distance between at least two of said magnetic wheels automatically adjusts as a function of irregularities on the surface to which the contact surfaces of said at least one set of magnetic wheels substantially conform.

14. A carriage assembly for moving equipment for testing or other functions along a surface, comprising:
- a main frame that supports the equipment,
- a sub-frame that supports supply lines providing at least one of power, data and working fluids to said equipment,
- at least one set of fixed position wheels mounted on said main frame, and
- at least one set of adjustable position wheels mounted on said main frame.

15. The carriage assembly according to claim 14, wherein said fixed position wheels are rubber rollers, and said adjustable position wheels are magnetic.

16. The carriage assembly according to claim 15, wherein said magnetic wheels are spring biased toward said main frame.

17. The carriage assembly according to claim 16, wherein said magnetic wheels are provided with contact surfaces that substantially conform to a non-planar surface.

18. The carriage assembly according to claim 17, wherein said magnetic wheels include facing conical surfaces.

19. The carriage assembly according to claim 18, wherein at least one of said magnetic wheels is mounted on a shaft and is free to rotate about and translate along said shaft.

20. The carriage assembly according to claim 14, wherein said sub-frame substantially isolates any loads created by said supply lines from said main frame.

* * * * *